June 25, 1946.  F. HIACK  2,402,550

ROTARY WEED PULLER

Filed Aug. 17, 1945

Frank Hiack,
INVENTOR.

BY
Attorneys

Patented June 25, 1946

2,402,550

UNITED STATES PATENT OFFICE 2,402,550

ROTARY WEED PULLER

Frank Hiack, Butler, Pa.

Application August 17, 1945, Serial No. 611,049

6 Claims. (Cl. 294—50.5)

This invention relates to weed pullers, and more particularly to a rotary weed puller.

A main object of the invention is to provide a novel and improved implement for removing weeds, said implement being of simple construction and being extremely easy to operate.

A further object of the invention is to provide an improved weed-pulling implement characterized by simplicity of structure and ease of manufacture, the implement being adapted to engage and uproot a weed by rotary motion and means being provided for rapidly ejecting the uprooted weed from the implement.

Further objects and advantages of the invention will appear from the following description and claims, and from the accompanying drawing, wherein:

Figure 1:
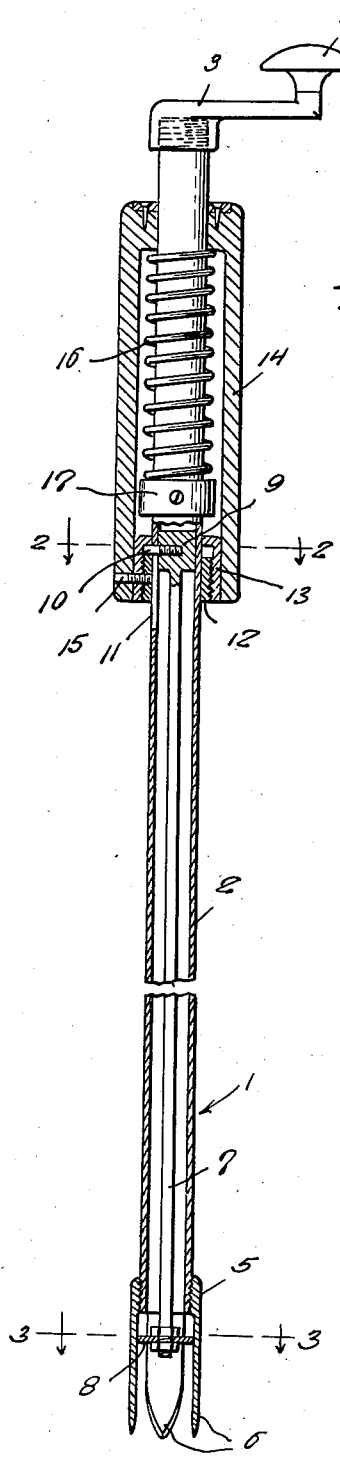
Figure 1 is a longitudinal cross-sectional view of a weed puller in accordance with this invention.
Figure 2:
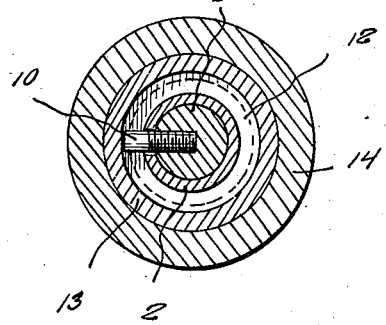
Figure 2 is a cross-sectional view taken on line 2—2 of Figure 1.

Referring to the drawing, 1 designates the body portion of the implement, said body portion comprising an elongated tubular shank 2 which is externally threaded at its top and bottom portions. Threadedly secured to the top portion is an offset handle member 3 provided with a freely rotatable knob 4. Threadedly secured to the lower portion is a toothed collar 5 formed with a plurality of elongated tines 6 arranged to be forced into the ground in encircling relation to a weed plant by downward pressure and rotation of handle member 3.

Axially positioned within shank 2 is an elongated rod member 7 carrying at its lower end a plunger disc 8 and formed at its upper end with an enlarged guide portion 9. Threadedly secured to portion 9 is a laterally extending pin 10 which passes through a slot 11 formed in tubular shank 2. Pin 10 is rotatably received between a bushing 12 and a cup member 13 threadedly secured to said bushing, the bushing and cup member being slidably carried on shank 2. A hollow handle member 14 of wood or similar material is slidably mounted on shank 2 and is secured at its lower portion to cup member 13 and bushing 12 by a threaded pin member 15. Encircling shank 2 within handle member 14 is a compression spring 16, said spring bearing between the upper wall of the handle member and a collar 17 secured to shank 2 to bias the handle member and rod 7 carried thereby to a raised position with respect to said shank. Plunger disc 8 is therefore maintained normally in a position near the top end of the recess formed by elongated tines 6.

When the implement is to be used, the operator grasps handle member 14 with one hand and handle member 3 with the other hand, exerting pressure on handle member 3 and simultaneously rotating said handle member 3 to firmly engage tines 6 in encircling relation with the weed plant. The rotary motion of the toothed collar 5 entangles the leaves of the weed plant with the tines 6. The downward pressure, simultaneous with the rotary motion of the tines, cuts the branch roots of the weed and also loosens a cylindrical mass of earth around the plant. The loosened weed is then extricated from the ground by lifting the implement out of its self-dug hole. The extricated weed is then ejected into a suitable receptacle by moving handle member 14 downwardly with respect to shank 2 against the biasing pressure of spring 16. Said spring restores the ejecting mechanism to normal position upon release of handle member 14.

Figure 3:
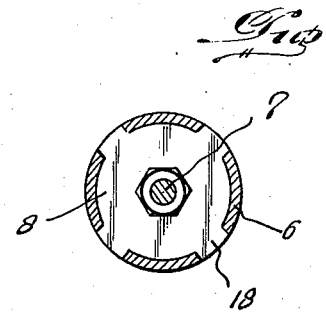
Figure 3 is a cross-sectional view taken on line 3—3 of Figure 1.

As shown in Figure 3, disc 8 is provided with lugs 18 received between adjacent tines 6 to aid in clearing the spaces between said tines of entangled leaves, roots and earth.

While a specific embodiment of a weed-pulling implement has been disclosed in the foregoing description it will be understood that various modifications within the spirit of the invention may occur to those skilled in the art. Therefore, it is intended that no limitations be placed on the invention other than as defined by the scope of the appended claims.

What is claimed is:

1. A weed-pulling implement comprising an elongated tubular shank, a plurality of tines at the lower end of said shank defining a weed-receiving recess, a plunger member within said recess, spring means biasing said plunger member to a raised position in said recess, a handle member secured to said plunger member for at times moving said plunger member downwardly in said recess, said handle member being rotatively mounted on said shank, and offset gripping means secured to the upper end of said shank.

2. The structure of claim 1, and wherein said handle member is hollow and said spring means is retained therein.

3. The structure of claim 1, and wherein the shank is formed with a longitudinal slot, said plunger member being rotatively secured to said handle member by a pin passing through said slot.

4. A weed puller comprising an elongated tubular shank carrying at its lower end a plurality of tines defining a weed-receiving recess and carrying at its upper end an offset gripping lever, a plunger within said recess, a rod axially mounted within said shank and slidable with respect thereto, said rod being connected at its lower end to said plunger, a handle member slidably embracing said shank adjacent its upper end, means rotatively connecting said handle member to said rod, and spring means biasing said handle member and said rod to a raised position with respect to said shank.

5. The structure of claim 4, and wherein said handle member is hollow and wherein the spring means is contained within said handle member.

6. The structure of claim 4, and wherein said plunger is formed with lugs received between adjacent tines, for the purpose of clearing the spaces between the tines of weeds and earth.

FRANK HIACK.